United States Patent [19]

Chronister

[11] Patent Number: 4,512,360
[45] Date of Patent: Apr. 23, 1985

[54] FABRICATED BALL VALVE

[76] Inventor: Clyde H. Chronister, 4 Kings Row, Houston, Tex. 77069

[21] Appl. No.: 445,137

[22] Filed: Nov. 29, 1982

[51] Int. Cl.³ .............................................. F16K 5/20
[52] U.S. Cl. ................................... 137/326; 251/175; 251/309
[58] Field of Search ............... 251/309, 315, 172, 175, 251/160, 314; 137/326

[56] References Cited

U.S. PATENT DOCUMENTS

| 2,857,130 | 10/1958 | Brisbane | 251/309 |
| 3,037,738 | 6/1962 | Jackson et al. | 251/172 |
| 3,194,255 | 7/1965 | Flaton et al. | 137/326 |
| 3,669,404 | 6/1972 | Kaiser | 251/172 |

FOREIGN PATENT DOCUMENTS

| 204341 | 7/1959 | Austria | 251/175 |
| 1115678 | 1/1982 | Canada | 251/309 |
| 1122788 | 1/1962 | Fed. Rep. of Germany | 251/175 |
| 1490328 | 6/1967 | France | 251/175 |
| 610130 | 10/1960 | Italy | 251/309 |

Primary Examiner—Martin P. Schwadron
Assistant Examiner—James R. Shay

[57] ABSTRACT

A fabricated ball valve is positioned between the inlet and the outlet of a valve housing and includes a first tubular member having sealing faces on each end for seating on valve seats and providing flow therethrough when the first tubular member is aligned between the inlet and the outlet. Second and third tubular axially aligned members have one end connected to the outside of the first member and have sealing faces on their other ends for seating on the valve seats. The second and third members block flow through the valve when the second and third members are aligned between the inlet and outlet. Sealing means may be on either the valve seats or on the movable seat ring connected to each of the other ends of the second and third tubular members. The seat rings are connected by a lost motion connection and include an outer seal in their outer ends for seating on the valve seat and an inner seal between the seat rings and the second and third members with the diameter of the inner seal greater whereby pressure urges the outer seal onto the valve seat. The housing may include a closure flange on the side or the top that can be opened for repairing the valve. The valve housing may include a raised face about the inlet and outlet for receiving a companion flange.

1 Claim, 7 Drawing Figures

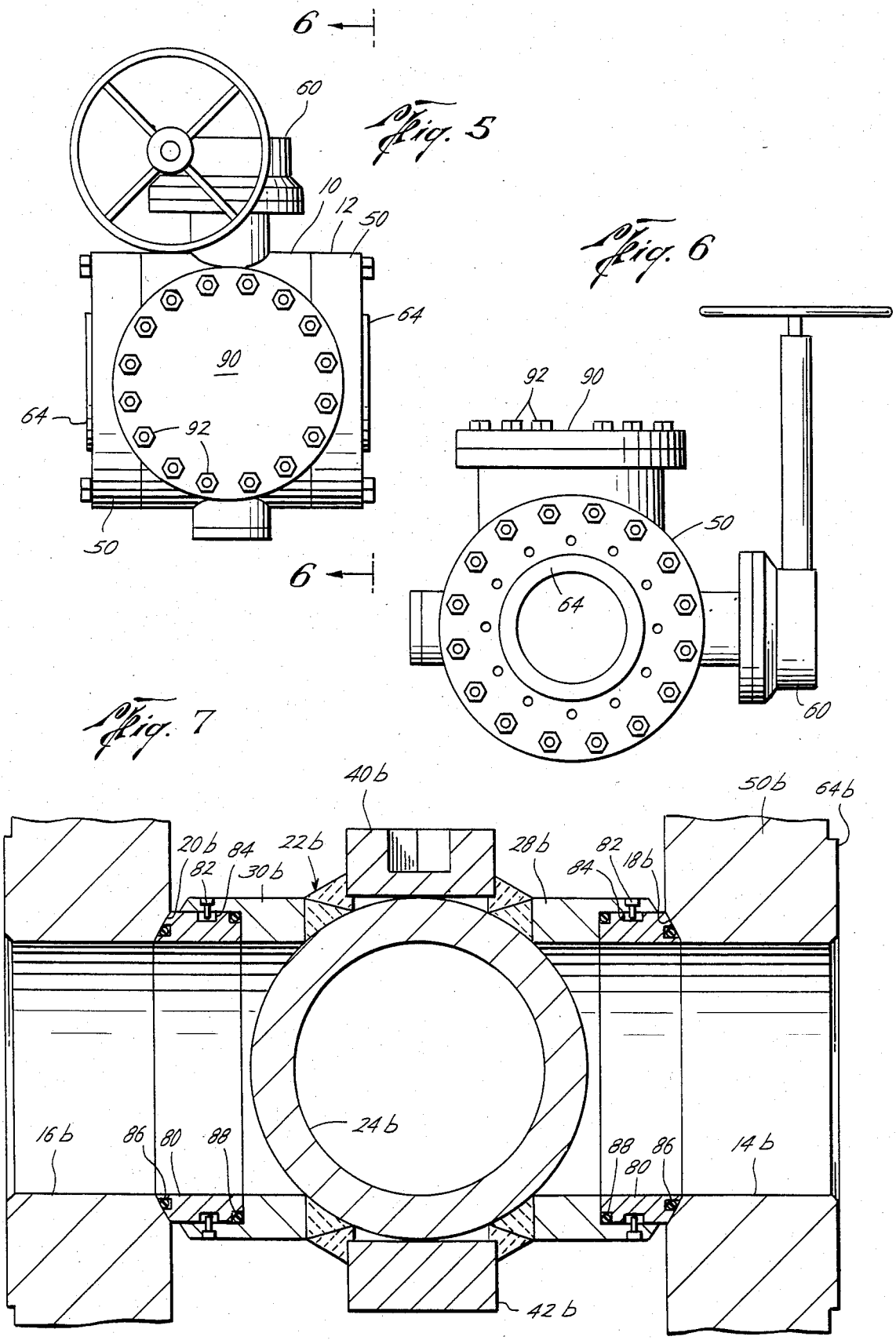

FABRICATED BALL VALVE

BACKGROUND OF THE INVENTION

Ball valves are commonly used for opening and closing fluid communication in a line and generally include a spherical valve element. However, in making larger size valves from 12 inch to 48 inch, the ball valves become very expensive and require sophisticated and expensive equipment for manufacturing. The present invention is directed to various improvements in a fabricated ball valve which when compared with other ball valves is much less expensive and requires less sophisticated and expensive manufacturing equipment.

SUMMARY

The present invention is directed to a fabricated ball valve having a housing with an inlet and outlet and a valve seat inside the housing adjacent each of the inlet and outlet. A fabricated ball valve element is positioned in the housing between the inlet and outlet and includes a first tubular member having sealing faces on each end for seating on the valve seats in the valve body and providing flow therethrough when the tubular member is aligned between the inlet and the outlet. Second and third tubular members have one end connected to the outside of the first member and have sealing faces on their other ends for seating on the valve seats. The second and third members are axially aligned on opposite sides of the first member and thus block the flow through the valve when the second and third members are aligned between the inlet and outlet. Trunnions are positioned on opposite sides of the first member perpendicular to the axis of the first member for rotating the fabricated ball.

Still a further object of the present invention wherein seal means are provided on either the valve seats or on the fabricated ball element.

Still a further object of the present invention is wherein a movable seat ring is telescopically connected to each of the other ends of the second and third tubular members. The seat rings are connected to the second and third members by a lost motion connection for allowing the rings to axially move relative to the second and third members. Preferably, the seat rings include an outer circular seal in their outer ends for seating on the valve seats and an inner seal between the seat rings and the second and third members, respectively. The diameter of the inner seal is greater than the diameter of the outer seal whereby the outer seal is urged onto a valve seat by pressure acting on the seat rings.

Yet a still further object of the present invention is wherein the valve housing includes a closure flange on either the side or the top depending on the direction of rotation of the fabricated ball that can be opened for repairing the valve.

Still a further object of the present invention is wherein the housing includes a raised face about the inlet and outlet and includes stud holes for receiving a companion flange wherein the housing can be made less expensively as it is smaller and requires fewer parts than standard valve housings.

Other and further objects, features and advantages will be apparent from the following description of presently preferred embodiments of the invention, given for the purpose of disclosure and taken in conjunction with the accompanying drawings.

BRIEF DESCRIPTION OF THE DRAWINGS

FIG. 5 is an elevational view of the preferred valve housing having a closure flange that can be quickly opened for repairing the valve, FIG. 6 is a cross-sectional view taken along the line 6—6 of FIG. 5, and FIG. 7 is a fragmentary elevational view, in cross section, of another embodiment of the fabricated ball valve of the present invention.

DESCRIPTION OF THE PREFERRED EMBODIMENT

Figure 3:
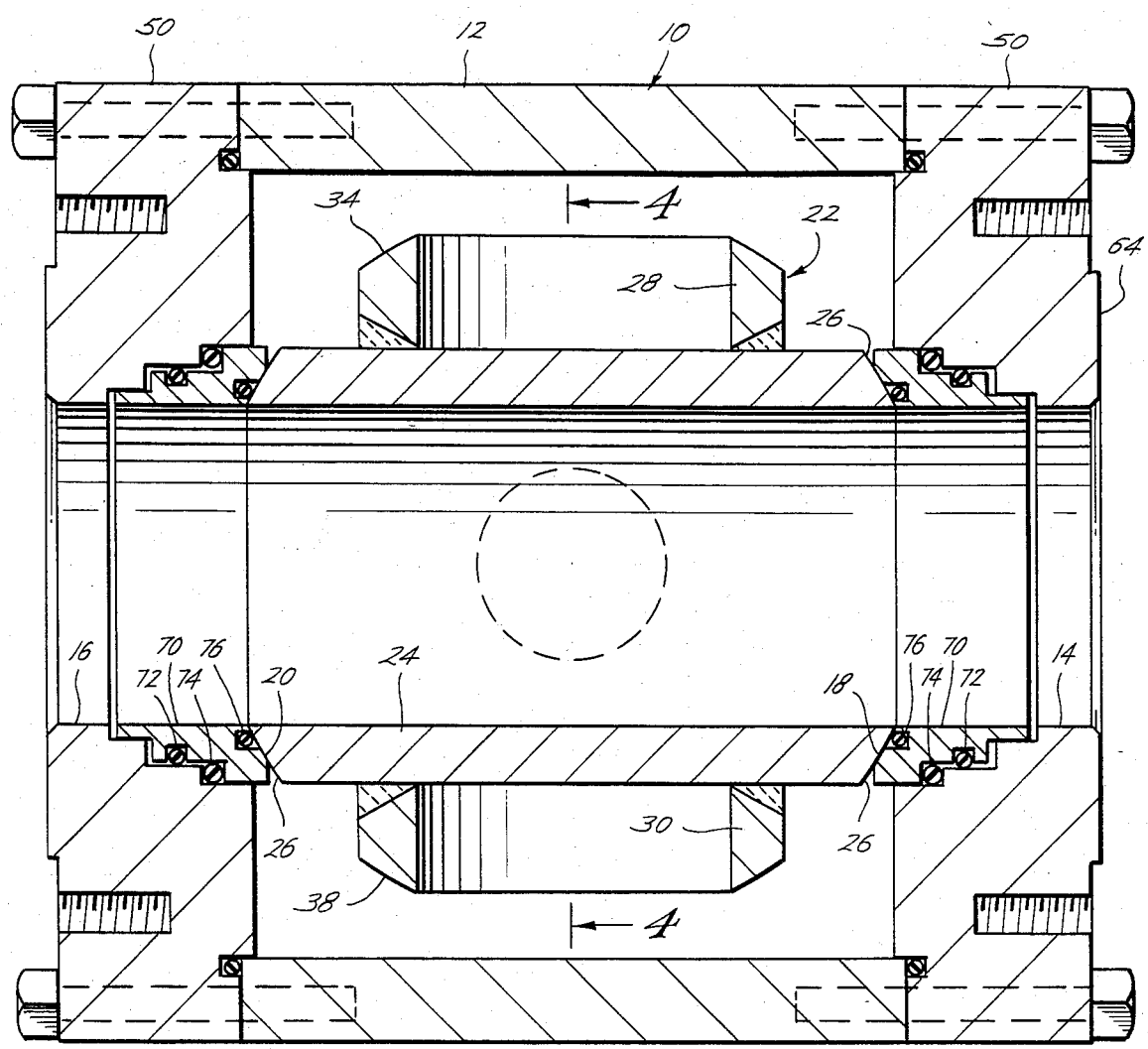
FIG. 3 is a cross-sectional view taken along the line 3—3 of FIG. 2.
Figure 4:
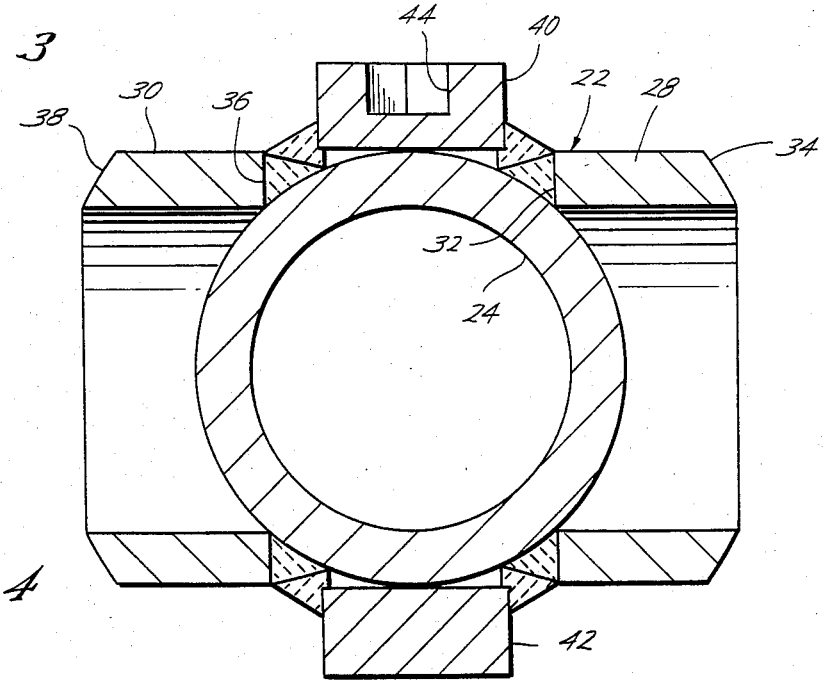
FIG. 4 is a cross-sectional view taken along the line 4—4 of FIG. 3.

Referring now to the drawings, and particularly to FIGS. 3 and 4, the fabricated ball valve of the present invention is generally indicated by the reference numeral 10 and generally includes a valve body or housing 12 having aligned openings 14 and 16, either one of which may be an inlet such as 14 and either of which may be an outlet such as 16, and a valve seat 18 and 20 positioned adjacent the inlet 14 and outlet 16, respectively.

A fabricated ball valve element generally indicated by the reference numeral 22 is positioned in the housing 12 between the inlet 14 and the outlet 16 and is engageable with the valve seats 18 and 20. The ball valve element 22 includes a first tubular member 24 having sealing faces 26 at each end for seating on the valve seats 18 and 20. The tubular member or conduit 24 provides flow therethrough when the member 24 is aligned between the inlet 14 and outlet 16 and places the valve 10 in the open position. Second and third tubular members or conduits 28 and 30 are provided having one end connected to the outside of the first member 24 and having sealing faces on their other ends for seating on the valve seat 18 and 20. Thus, second member 28 is secured to the outside of the conduit 24 by its end 32 such as by welding and includes at its other end a sealing face 34. The third member 30 has its one end 36 secured to the outside of the first tubular member 24 such as by welding and has its other end provided with a sealing face 38 for seating on the valve seat 18 and 20. The second member 28 and the third member 30 are axially aligned on opposite sides of the first member 24 and have their axis perpendicular to the axis of the first tubular member 24. When the second member 28 and the third member 30 are aligned between the inlet 14 and the outlet 16 fluid flow through the valve is blocked and the valve 10 is in the closed position. Of course, in some applications, one of the second and third conduits 28 and 30 may be omitted. Trunnions 40 and 42 are positioned on opposite sides of the first tubular member 24 such as by welding and are perpendicular to the axis of the first member 24. One of the trunnions such as 40 includes connecting means 44 for connection to any suitable valve actuator for rotating the fabricated ball 22. The fabricated ball 22 can be very inexpensively and easily made as compared to the present type spherical ball as the first, second and third members, 24, 28 and 30, may be made of pipe, rolled plate, forgings, or castings which may be quickly and easily cut into shape and welded together. The sealing faces 26, 34 and 38 are preferably sectors of a sphere for rotating about the axis of the trunnions 40 and 42 and engaging the valve seats 18 and 20.

Figure 1:
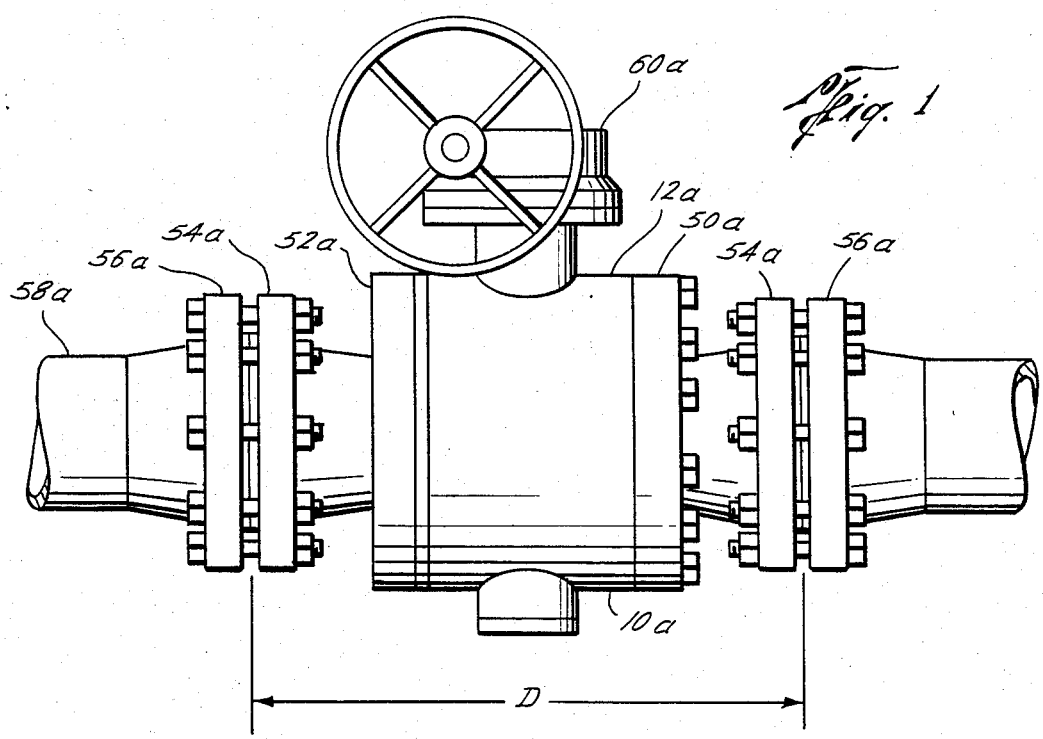
FIG. 1 is an elevational view showing a standard valve housing into which the fabricated ball of the present invention may be used.

The fabricated ball valve element 22 of the present invention may be installed in any suitable housing 12. For example, the ball valve element 22 may be installed in a conventional housing 12a as best seen in FIG. 1 having one or more end plates 50a which may be bolted to the body 12a or one or more end plates 52a which are welded to the body 12a. The valve 10a has connected to its housing 12a conventional flanged ends 54a, which are adapted to receive companion flanges 56a from a pipeline 58a in which the coacting flanges 54a and 56a are held together with bolts and nuts. It is necessary to meet certain industry standards and the valve 10a can be made to meet the face-to-face requirements D. The valve 10a includes a standard valve actuator 60a for actuating and controlling a suitable ball valve element such as element 22 of the present invention.

Figure 2:
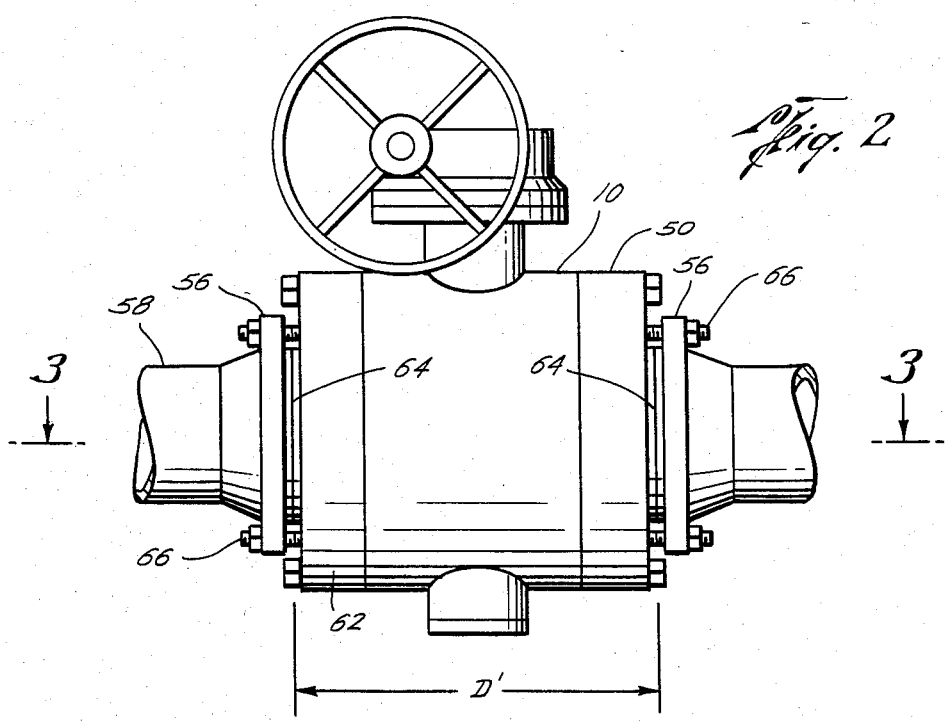
FIG. 2 is an elevational view of an improved valve housing having fewer parts and being less expensive than the housing of FIG. 1 for utilizing the fabricated ball of the present invention.

FIG. 2 shows the preferred valve 10 for accommodating the fabricated ball valve element 22 of the present invention which includes flanges 50 having a raised face or ring joint 64 to mate with companion flanges 56 of a pipeline 58. By allowing the companion flanges 56 to be mated directly to the flanges 62 the valve 10b can be made less expensive by omitting the additional flanges 54a of the conventional valve housing 10a and the face-to-face distance D' meets certain industry standards in the lower class ratings. The companion flanges 56 are secured to the flanges 62 by stud bolts 66.

The seals for sealing the fabricated ball valve element 22 against the housing 12 may be positioned on either the valve seats 18 and 20 or on the sealing faces 26, 34 and 38. In the embodiment of FIGS. 3 and 4 seals are provided in the housing. Thus, each of the seat seals 76 may include a sliding sleeve 70 positioned about the openings 14 and 16 and include O-ring seals 72 and 74 for sealing between the sleeve 70 and the housing 12. The seals 76 seal with the sealing faces 26, 34 and 38. Thus, as the fabricated ball valve element 22 is rotated the sealing faces 26, 34·and 38 will rotate into contact with the resilient seal 76 such as an elastomer type to provide the valve seal.

Referring now to FIG. 7, another embodiment of the fabricated ball valve of the present invention is shown wherein like parts are numbered similarly to those in FIGS. 3 and 4 with the addition of the suffix "b". In this embodiment, the seals are provided on the ball element 22b wherein a movable seat ring 80 is provided telescopically connected to each of the outer ends of the second and thrd members 28b and 30b. In addition, seals may be provided at both ends of the first conduit 24b although they may be omitted as seals are not always required when the valve is in the open position. A lost motion connection is provided between the seat rings 80 to allow them to telescopically move for mating with the valve seats 18b and 20b. Thus, lock screws 82 are provided which extend into a groove or opening 84 in the rings 80 which are larger in size than the diameter of the screws 82. Therefore, the rings 80 may move longitudinally relative to the members 28b and 30b. A suitable resilient seal 86 is provided in the outer face of the seat rings 80 for contacting and sealing on the valve seats 18b and 20b. Additionally, another seal such as a resilient seal 88 is provided between the rings 80 and each of the members 28b and 30b. It is to be particularly noted that the diameter of the seals 88 is greater than the diameter of the resilient face seals 86. When the seat seals 86 come into contact with the valve seats 18b and 20b the seals 88 tend to push the rings 80 toward the valve seats 18b and 20b. The service pressure is then trapped into the dead end conduits 28b and 30b causing the seat seals 86 to seal tighter against valve seats 18b and 20b. The service pressure acting against the back of the seat ring 80 pushes the seat ring 80 towards the valve seats 18b and 20b because the area on which it acts on the back side of seal 88 is greater than on the face side seat seals 86 since the diameter of seal 88 is greater than the diameter of the face seal 86.

The valve housing shown in FIGS. 5 and 6 is the valve of FIG. 2 with the addition of a closure flange making it possible to repair the valve 10 without removal of the valve 10 from the line. Thus the valve 10 includes a closure flange 90 which is connected to the valve housing 12 by suitable bolts 92. The closure flange 90 is mounted on the housing 12 in a plane parallel to the trunnions 40 and 42 which allows the inside of the valve to be opened up for inspection and repair. And in the case of the modified embodiment of the valve shown in FIG. 7, allows the replacement of the seat rings 80 and the seals 86 and 88. As shown, the valve 10 may be placed in a position with the valve closure 90 on the side or if desired the valve 10 may be rotated 90 degrees as best seen in FIG. 6 wherein the valve closure 90 is on the top.

The present invention, therefore, is well adapted to carry out the objects and attain the ends and advantages mentioned as well as others inherent therein. While presently preferred embodiments of the invention have been given for the purpose of disclosure, numerous changes in the details of construction and arrangement of parts may be made without departing from the spirit of the invention and the scope of the appended claims.

What is claimed is:

1. A fabricated ball valve comprising,
    a housing having an inlet and outlet and a valve seat inside the housing adjacent each of the inlet and outlet,
    a fabricated ball valve element positioned in the housing between the inlet and outlet and including,
        a first cylindrical tubular pipe member having a sealing face on each end for seating on the valve seats and providing flow therethrough when the first tubular member is aligned between the inlet and outlet,
        second and third cylindrical tubular pipe members having one end weldably connected to the outside of the first member and having a sealing face on their other ends for seating on the valve seats, said second and third members axially aligned on opposite sides of the first member and blocking flow through the valve when the second and third members are aligned between the inlet and outlet,
        trunnions positioned on opposite sides of the first member perpendicular to the axis of the first member for rotating the fabricated ball,
    a movable seat ring telescopically connected to the interior of each of the other ends on the second and third tubular members, the seat rings are connected to the second and third members by a lost motion connection allowing the rings to axially move relative to the second and third members, said seat rings include an outer resilient seal in their outer ends for seating on the valve seats, and an inner seal between the seat rings and said second and third members, respectively, the diameter of the inner seal is greater than the diameter of the outer seal whereby the outer seals are urged away from the valve element and onto a valve seat by service pressure acting on the seat rings, said housing including a closure flange in a plane parallel to the trunnions that can be opened for repair and replacement of the seat rings and seals.

* * * * *